United States Patent
Ishii

(10) Patent No.: US 6,266,107 B1
(45) Date of Patent: Jul. 24, 2001

(54) DISPLAY PANEL FIXING STRUCTURE

(75) Inventor: Takayuki Ishii, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/411,638

(22) Filed: Oct. 1, 1999

(30) Foreign Application Priority Data

Oct. 5, 1998 (JP) .................................................. 10-282598

(51) Int. Cl.⁷ .................................................. G02F 1/1533

(52) U.S. Cl. .............................................. 349/58; 349/60

(58) Field of Search .................................. 349/58, 59, 60

(56) References Cited

U.S. PATENT DOCUMENTS 5,587,817 * 12/1996 Miyamoto et al. ..................... 349/58

* cited by examiner

*Primary Examiner*—James A. Dudek
(74) *Attorney, Agent, or Firm*—Fitzpatrick, Cella, Harper & Scinto

(57) ABSTRACT

A display panel, such as a liquid crystal panel, fixed onto a holder plate is aligned with other optical members, and while the alignment is maintained, the holder plate is fixed onto a panel-fixing frame with solder. At least one of the holder plate and the panel-fixing frame at the fixing region is provided with an opening or a cut, whereby the scattering of the solder around the fixing region is prevented and an improved fixing strength is attained.

6 Claims, 5 Drawing Sheets

DISPLAY PANEL FIXING STRUCTURE

FIELD OF THE INVENTION AND RELATED ART

The present invention relates to a fixing structure for a picture display unit of an illumination-type picture display apparatus, such as a rear projection display apparatus for an audio-visual system, and a data projector for displaying computer output data.

A conventional color liquid crystal projector using liquid crystal panels has included a plurality of liquid crystal panels in order to display a high quality picture, whereby the plurality of liquid crystal panels are illuminated with primary color light fluxes formed by color separation and the light fluxes emitted from the liquid crystal panels are color-synthesized to display a color picture.

In this way, in the conventional system, the respective color liquid crystal panels are respectively screwed to movable stages without a particular positional alignment, and the positions of the movable stages are then adjusted so as to achieve adequate superposition of the respective color pictures to form a multi-color picture. Thereafter, in the adjusted positions, the movable stages are fixed, e.g., with a bonding agent.

However, as the respective liquid crystal pannels used for color synthesis are fixed onto the movable stages, the deviation or alignment failure among the liquid crystal panels is liable to occur not only in case where the movable stages are not sufficiently fixed but also in case where the movable stages are sufficiently fixed.

In recent years, a small-size liquid crystal panel accompanied with a small optical system is becoming used in order to provide a smaller projection apparatus, and on the other hand, a higher resolution has been demanded. For complying with such demands on the market, there is an increasing demand for a small-size high-resolution liquid crystal panel. However, a small-size high-resolution liquid crystal panel is necessarily required to have a smaller pixel size which has been reduced down to several $\mu$m to ten and several $\mu$m.

If one pixel size is reduced to such a small size, it becomes impossible to ignore a minute play or an elongation or shrinkage corresponding to a temperature change of a movable stage as a source of liquid crystal panel alignment failure. For this reason, instead of the method of alignment by positional adjustment of a movable stage on which a liquid crystal panel is fixed, there has been adopted a method where each liquid crystal panel is directly fixed onto a holder for alignment separate from a projection optical system, the position alignment of each liquid crystal panel is effected by the holder, and the respective panels are directly fixed onto panel-fixing frames in a projection optical system by means of solder or other bonding agents.

FIGS. 4A and 4B illustrate an example of the panel-fixing method. Referring to FIGS. 4A and 4B, a holder plate 12 on which a liquid crystal panel 11 is fixed has a fixing region FX, at which a panel-fixing frame 13 is fixed with solder 14, such as creamy solder or thread solder.

In the solder fixing system, it is necessary to melt the solder while retaining the alignment of each liquid crystal panel and heat the solder fixing region FX while retaining the alignment state. For this purpose, non-contact heating is preferred, and creamy solder is preferred to thread solder because of easier melting. Creamy solder is also preferred because it has a smaller heat expansion coefficient and it readily melts on re-heating, thus allowing re-adjustment of the alignment by re-heating.

Accordingly, it has been practiced to apply creamy solder at the solder fixing region FX and heating the region by light-beam heating as a non-contact heating method to form a solder fixed liquid crystal panel unit as shown in FIGS. 4A and 4B.

However, in the above-mentioned process, as is understood from the sectional view of FIG. 4A, the creamy solder is sandwiched between the panel holder substrate 12 and the panel-fixing frame 13 at the solder fixing region FX, and a flux contained in the sandwiched creamy solder is evaporated on temperature increase under heating, whereby solder is liable to be scattered out of the solder fixing region due to the evaporation of the flux to soil the panel and other optical devices close thereto if the panel holder is in a flat sheet form at the solder fixing region FX.

During the soldering, the melted solder also wets sides of the holder plate 12 at the solder fixing region due to its surface tension to increase the resultant fixing strength. However, if the holder plate 12 is in a flat sheet form at the solder fixing region FX, the side wall portions of the holder plate 12 to be wetted by the melted solder is small in area.

The above-problems occur in fixing structures of not only liquid crystal panels but also other display panels.

SUMMARY OF THE INVENTION

In view of the above-mentioned problems, a principal object of the present invention is to provide a display panel-fixing structure capable of preventing the scattering of solder at a solder-fixing region of fixing an aligned display panel unit.

Another object of the present invention is to provide a display panel-fixing structure exhibiting an improved soldering strength at a solder-fixing region of fixing an aligned display panel unit.

According to the present invention, there is provided a display panel-fixing structure, comprising a holder plate holding a display panel, a panel-fixing frame for fixing the display panel, and a bonding agent bonding the holder plate and the panel-fixing frame at a fixing region where the holder plate and the panel-fixing frame is superposed with each other, wherein at least one of the holder plate and the panel-fixing frame is provided with an opening or cut at the fixing region.

Because of the presence of the opening or cut in at least one of the holder plate and the panel-fixing frame at the fixing region, the flux or vaporizable component of the bonding agent, typically solder, sandwiched between the holder plate and the panel-fixing frame can be effectively evaporated through the opening or cut, thereby suppressing the scattering of the solder around the fixing region, and the opening or cut provides an additional wall area to be wetted with the solder, thereby increasing the soldering strength at the fixing region.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

FIRST EMBODIMENT

Figure 1A:
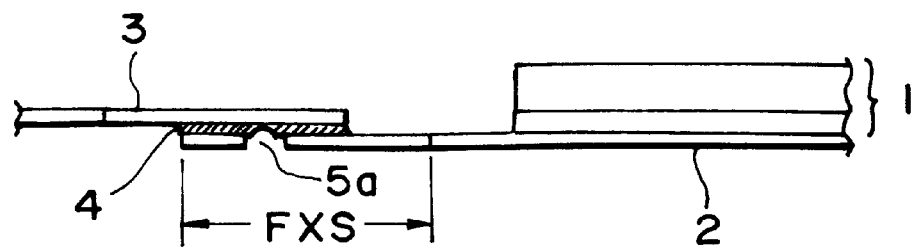
FIGS. 1A and 1B are a partial sectional view and a partial plan view, respectively, of a first embodiment having an opening of the display panel-fixing structure according to the invention.
Figure 1B:
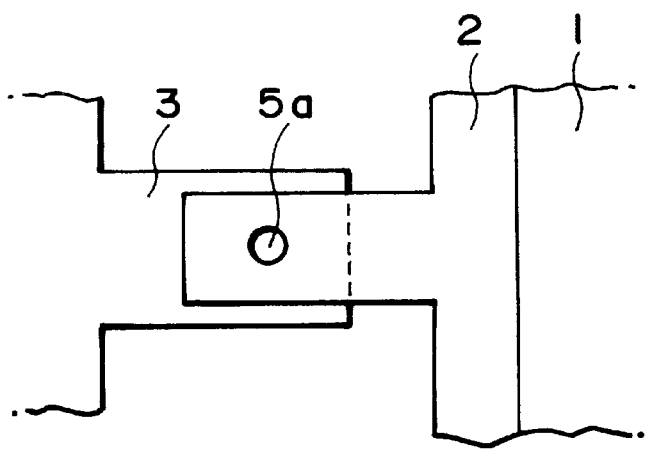

FIGS. 1A and 1B are a partial sectional view and a partial plan view, respectively, of a display panel-fixing structure according to a first embodiment of the present invention. Referring to these figures, the display panel-fixing structure includes a liquid crystal panel 1 as a display panel, and a holder plate 2 for holding the liquid crystal panel unit. The holder plate 2 includes a solder-fixing section FS having a good affinity with solder and comprising Fe—Ni alloy showing good wettability with solder in this embodiment.

More specifically, 42%—Ni alloy is used as a specific example in this embodiment, but permalloy (Fe-Ni alloy containing 35–80% Ni) is generally suitably used. It is also possible to use solder plated steel or other materials which per se do not show good wettability with solder.

The panel-fixing frame 3 is also required to be wettable with solder similarly as the solder-fixing section of the holder plate 2 and may suitably comprise a material, such as permalloy.

The solder-fixing section FXS of the holder plate 2 is provided with a circular opening 5a (FIGS. 1A, 1B; 2A).

Figure 2A:
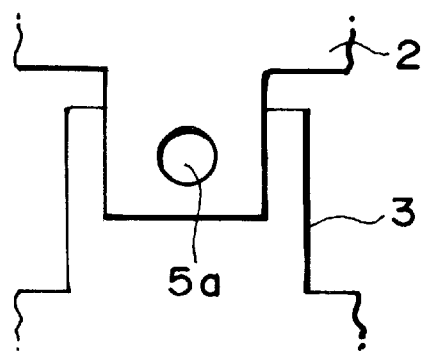
FIGS. 2A–2C are plan views each showing an example of other opening shapes according to the first embodiment.
Figure 2B:
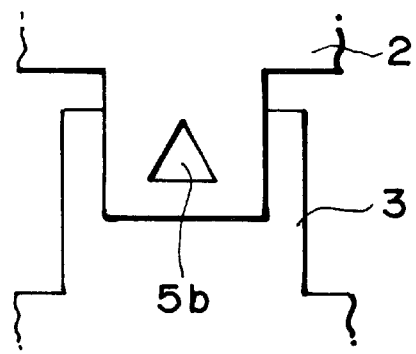

The shape of the opening is not restricted to a circle as shown in FIGS. 1A, 1B and 2A, but may be any arbitrary shape, inclusive of a triangle (FIG. 2B) and a tetragon, such as a rectangle or square (FIG. 2B). The opening is provided to the holder plate 2 but may also be provided to the panel-fixing frame 3 or both of the holder plate 2 and the panel-fixing frame 3. Not only a single opening but also plural openings may be provided.

In a specific example of this embodiment, the holder plate 2 (of 38 mm×37 mm in planar size for supporting a liquid crystal panel 1 of 31 mm×30 mm) had a thickness of 0.8 mm and was provided with 4 projections each forming a fixing section FXS having a width of 5 mm and provided with a circular opening of 2.2 mm in diameter, and the liquid crystal panel-fixing frame 3 had a thickness of 1.0 mm.

The holder plate 2 is formed from a metal plate by mold-pressing, whereby the opening is simultaneously formed. The opening may also be formed by cutting with, e.g., $CO_2$ laser beam.

The fixing section FXS of the holder plate 2 and the panel-fixing frame 3 are bonded to each other with solder 4 for each primary color liquid crystal panel, after positional alignment among generally three primary color liquid crystal panels.

Figure 4A:
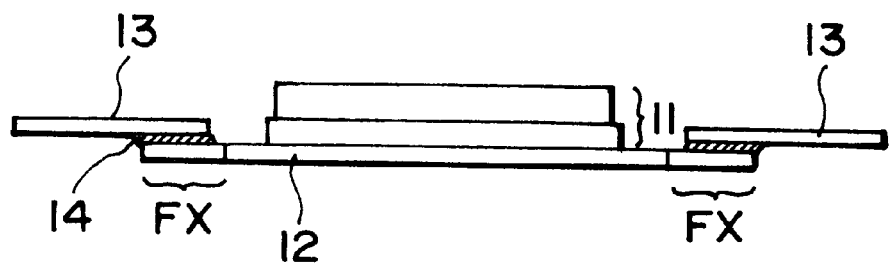
FIGS. 4A and 4B are a sectional view and a plan view, respectively, of a display panel-fixing structure of the prior art.
Figure 4B:
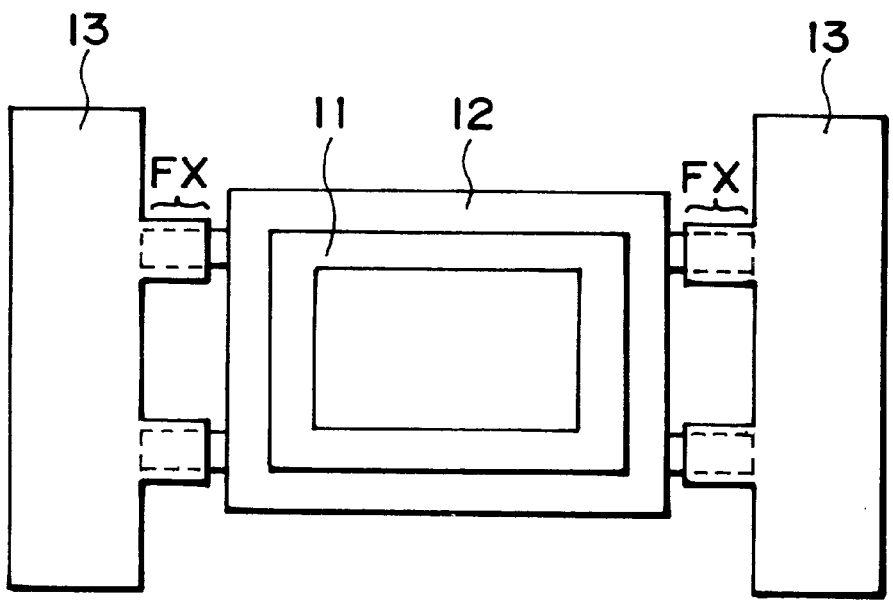
Figure 5:
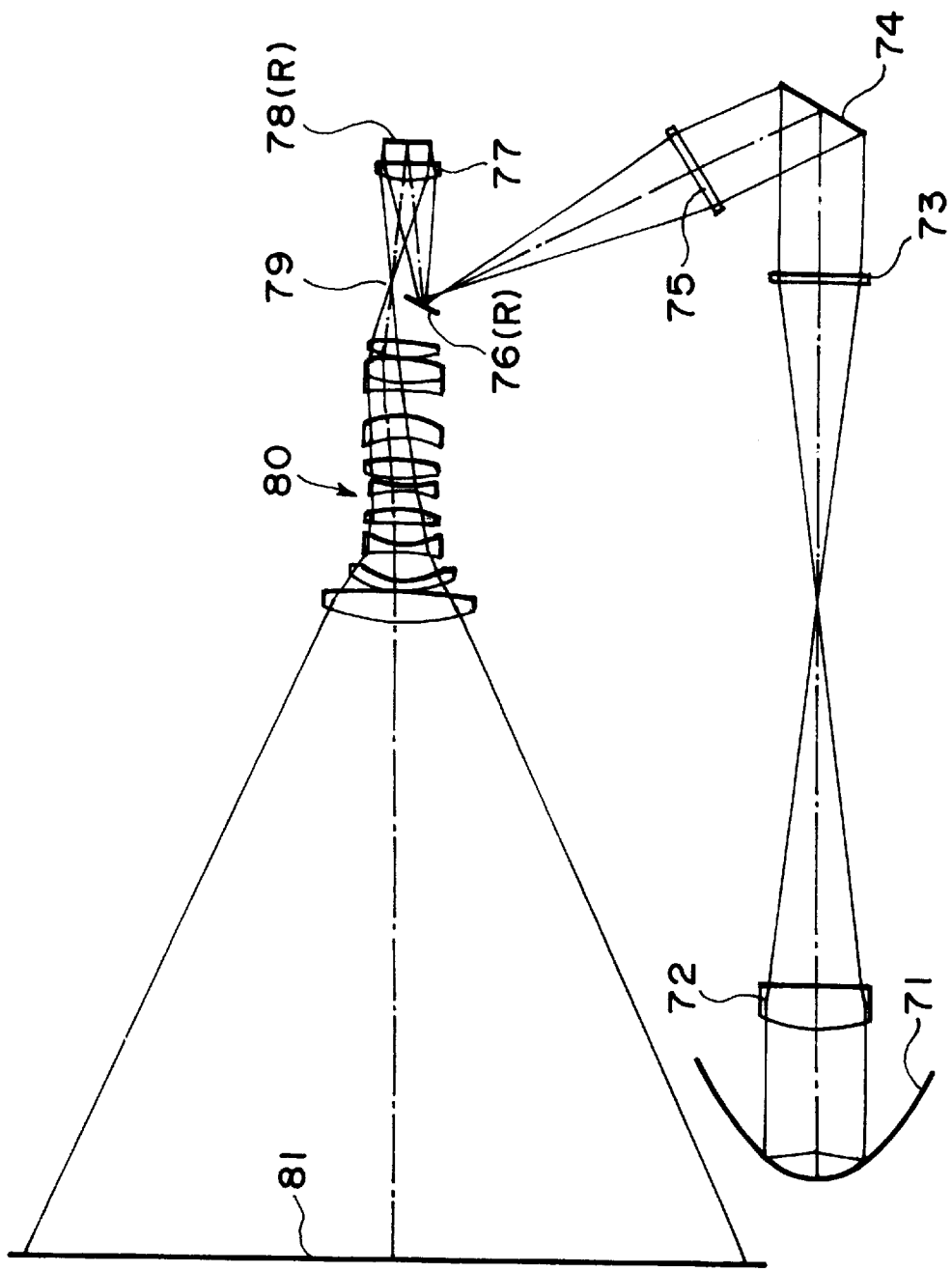
FIG. 5 illustrates an example of projection-type display system including a display panel provided with a display panel-fixing structure according to the invention.

The positional alignment is effected while projecting a displayed picture on a first primary color liquid crystal panel 1 fixed to the holder plate 2 and supported on the alignment member via a projection optical system, e.g., as shown in FIG. 5 (described in detail hereinafter) onto a screen 81, and the first primary color liquid crystal panel 1 is held in position. Then, the other primary color liquid crystal panels are alignment-adjusted respectively similarly as above and aligned with each other to be held in position. Separately, creamy solder comprising solder balls and a flux for improving the wetting of a metal plate with the solder is applied on each of 4 fixing sections 3 each having a width of ca. 5 mm of each of three panel-fixing frames (similar to a combination as an entire shape of two members 13 in FIG. 4A).

More specifically, creamy solder is formed as a mixture of solder balls and 10–20 wt. % of flux. The solder may be composed of, e.g., an alloy of Sn 63 wt. % and Pb 37 wt. % or an alloy of Sn 46 wt. %, Pb 46 wt. % and Bi 8 wt. %. The solder balls may be spherical balls of 350–500 mesh. In a specific example, a commercially available solder comprising solder balls as described above and ca. 18 wt. % of flux and in the form of a paste having a viscosity of ca. 300 Pa.s at 25° C. was used.

For application, the creamy solder is charged in a syringe or a dispenser and applied in an area of, e.g., ca. 5 mm×5 mm and in a thickness of, e.g., ca. 0.7 mm on each fixing section 3 of the panel-fixing frame.

Then, each panel-fixing frame 3 thus applied with creamy solder is then aligned with one of the holder plates 2 carrying the primary color liquid crystal panels 1 positionally aligned with each other in the above-described manner so as to sandwich the applied creamy solder with the fixing sections FXS of the holder plate 2. Then, in the aligned state for each primary color liquid crystal panel 1, the fixing section FXS of the holder plate 2 and the panel-fixing frame 3 are irradiated with condensed light guided through optical fiber from a high-pressure mercury lamp so as to heat the creamy solder sandwiched therebetween.

The irradiation light intensity may be adjusted depending on the shape of the fixing section FXS so as to provide an optimum solder melting condition. In a specific example, condensed light from a high-pressure mercury lamp at a power of 15–20 W was used to locally selectively illuminate a region of a ca. 5 mm in diameter around the circular opening 5a at an incident angle of ca. 45 deg.

By the condensed light irradiation, the irradiated position of the holder plate 2 may be heated up to ca. 250° C. in 10 sec., relative to a solder melting point of ca. 140° C., whereby a portion of the flux contained in the creamy solder is evaporated off, and the remainder is liquefied. The liquefied or evaporated flux is liberated out of the opening 5a of the holder plate 2. Further, the solder balls are simultaneously melted to fix the fixing section of the holder plate 2 and the panel-fixing frame 3 to each other with the aid of a solder-wettability-improving effect of the flux. After cooling, the respective primary color liquid crystal panels 1 held on the associated holder plates 2 are soldered to the associated panel-fixing frames 3 in their mutually aligned positions.

SECOND EMBODIMENT

Figure 2C:
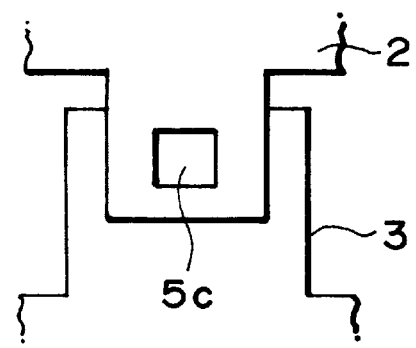
Figure 3A:
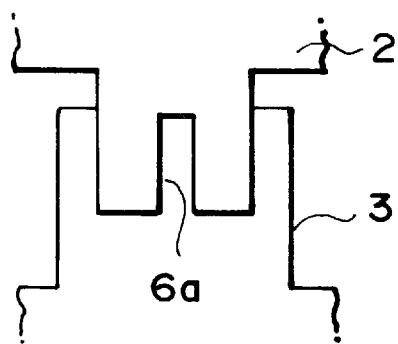
FIGS. 3A–3C are plan views each showing an example of a cut-shape according to a second embodiment of the display panel-fixing structure according to the invention.
Figure 3B:
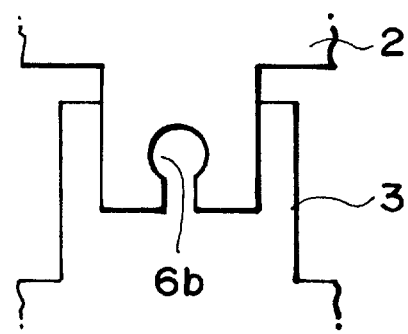
Figure 3C:
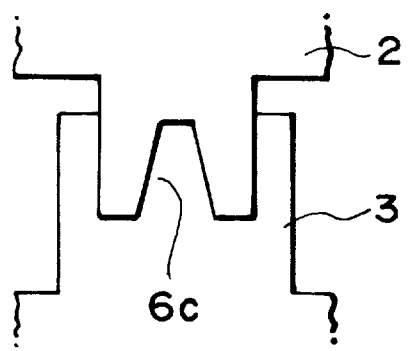

FIGS. 3A–3C are partial plan views corresponding to FIGS. 2A–2C (for the first embodiment) for illustrating some shapes of cuts provided to a holder plate 2 according to this embodiment. More specifically, FIG. 3A shows a simple slit-form cut 6a; FIG. 3B, a cut 6b in a form of an opening communicated with an edge of the holder plate 2; and FIG. 3C, a tapered cut 6c.

Similarly as the opening provided in the first embodiment, each of the cuts 6a–6c may be provided in a plurality and may also be provided to the panel-fixing frame 3 or both the holder plate 2 and the panel fixing frame 3.

The cuts 6a–6c function similarly as the openings 5a–5c provided in the first embodiment.

Thus, by providing an opening or a cut to at least one of a panel-older plate and a panel-fixing frame to be fixed to each other with solder after alignment of these members, the scattering of solder out of the fixing region, and an improved fixing strength is provided.

FIG. 5 illustrates an optical system including a reflection-type liquid crystal panel held by a display panel-fixing structure according to the present invention. The optical system generally includes at least three liquid crystal panels for at least three colors of display, a blue-reflection dichroic mirror for separation of blue light, a red-reflection dichroic mirror for separation of red light, and a green/blue-reflecting dichroic mirror for separation of green light, disposed preferably in this order, to illuminate the respective liquid crystal panels for projection display.

In the optical system shown in FIG. 5, only the red color display system is shown and the other blue and green display systems are omitted from showing. Referring to FIG. 5, the optical system includes a light source 71 such as a halogen lamp, a condenser lens 72 for condensing a source light image, a planar Fresnel convex lenses 73, a color-separation optical device 74, such as a dichroic mirror or a diffraction grating, for color separation into R, G and B, planar Fresnel lenses 74 (only one being shown), mirrors 76 (only one being shown) for guiding respective separated lights to the respective color liquid crystal display panels 78, field lenses 77 for receiving condensed lights and illuminating the respective reflection-type liquid crystal panels with parallel lights, the reflection-type liquid crystal panels 78 each identical to a liquid crystal panel 1 in FIG. 1A, a stop 79, a projection lens system 80 and a projection screen 81. The screen 81 may ordinarily comprise a Fresnel lens for converting projected light to parallel light and a lenticular lens for allowing a display with vertically and laterally wide viewing angles, so as to provide a bright picture with a clearly high contrast. As mentioned above, FIG. 5 shows only one color display system, but members (75–78) between the color-separation optical device 74 and the stop 79 are each provided in a set of at least three members for display of at least three colors.

In operation, regularly reflected light from respective pixels of each liquid crystal device 78 (R) driven under application of drive voltage is passed through the stop 79 and projected onto the screen 81. On the other hand, light having entered pixels not supplied with a voltage but comprising a liquid crystal layer in a scattering state of the reflective liquid crystal device 78 is isotropically scattered to generally fail in entering the aperture angle of the stop 79 and thus the projection lens 80, thus providing black spots on the screen 81.

As is understood from the above explanation of the optical system, each liquid crystal panel 78 does not require a polarizer, and each signal light reflected at a high reflectance from the entire area of each pixel electrode can enter the projection lens 79, so that a bright display of 2 to 3 times as bright as in the conventional system can be realized. Further, by providing the counter substrate with an anti-reflection treatment on both the outer surface and the boundary with the liquid crystal layer, it is possible to realize a high contrast display with extremely low noise light component. Further, as the panel size can be minimized, all the associated optical devices, such as lenses and mirrors, can be reduced in size, thus allowing a lighter apparatus with a lower production cost. Further, irregularity or fluctuation in color and luminance can be removed on the screen by inserting an integrator of the fly-eye lens-type or the rod lens-type.

What is claimed is:

1. A display panel fixing structure, comprising a holder plate holding a display panel, a panel-fixing frame for fixing the display panel, and a bonding agent bonding the holder plate and the panel-fixing frame at a fixing region where the holder plate and the panel-fixing frame is superposed with each other, wherein at least one of the holder plate and the panel-fixing frame is provided with an opening or cut at the fixing region.

2. A structure according to claim 1, wherein said bonding agent comprises solder.

3. A structure according to claim 2, wherein said solder is creamy solder comprising solder balls and a flux in pasty mixture.

4. A structure according to claim 2, wherein the holder plate and the panel-fixing frame have been aligned with each other before they are bonded to each other with the solder.

5. A structure according to claim 1, wherein said display panel is a projection-type display panel.

6. A structure according to claim 5, wherein said display panel is a liquid crystal panel.

* * * * *

UNITED STATES PATENT AND TRADEMARK OFFICE
CERTIFICATE OF CORRECTION

PATENT NO. : 6,266,107 B1
DATED : July 24, 2001
INVENTOR(S) : Takayuki Ishii

It is certified that error appears in the above-identified patent and that said Letters Patent is hereby corrected as shown below:

Column 1,
Line 27, "pannels" should read -- panels --.

Column 3,
Line 22, "panel unit." should read -- panel 1, which in combination constitute a liquid crystal panel unit. --.
Line 23, "FS" should read -- FXS --.
Line 24, "Fe—Ni" should read -- Fe-Ni --.
Line 26, "42%—Ni" should read = =42%-Ni --.

Column 4,
Line 22, "3" should be deleted.

Signed and Sealed this

Eleventh Day of June, 2002

Attest:

Attesting Officer

JAMES E. ROGAN
*Director of the United States Patent and Trademark Office*